United States Patent [19]

Bovenkerk

[11] 4,259,090
[45] Mar. 31, 1981

[54] METHOD OF MAKING DIAMOND COMPACTS FOR ROCK DRILLING

[75] Inventor: Harold P. Bovenkerk, Worthington, Ohio

[73] Assignee: General Electric Company, Worthington, Ohio

[21] Appl. No.: 95,903

[22] Filed: Nov. 19, 1979

[51] Int. Cl.³ .............................................. B24D 3/02
[52] U.S. Cl. ........................................ 51/309; 51/307; 51/308
[58] Field of Search ......................... 51/307, 308, 309

[56] References Cited

U.S. PATENT DOCUMENTS

| | | | |
|---|---|---|---|
| 3,407,445 | 10/1968 | Strong | 51/307 |
| 3,850,053 | 11/1974 | Bovenkerk | 51/309 |
| 3,850,591 | 11/1974 | Wentorf | 51/309 |
| 4,089,933 | 5/1978 | Vereschagin | 51/307 |
| 4,151,686 | 5/1979 | Lee et al. | 51/307 |
| 4,167,399 | 9/1979 | Lee et al. | 51/307 |
| 4,168,957 | 9/1979 | Lee et al. | 51/309 |

*Primary Examiner*—Donald E. Czasa
*Assistant Examiner*—W. Thompson
*Attorney, Agent, or Firm*—Douglas B. Little

[57] ABSTRACT

An improvement in the manufacture of diamond compacts is disclosed in which a cylindrical mass of polycrystalline diamond is surrounded by and bonded to an outer mass of metal which provides support for the diamond. The improvement comprises the use of seed diamond to grow the polycrystalline mass under high pressure-high temperature (HP/HT) conditions from non-diamond carbon, utilizing a catalyst metal contained in the outer metal annulus. Preferably, this improved process is carried out using a cup-shaped metal mass having a stable carbide content of at least 10% and a coefficient of thermal expansion slightly higher than diamond. It is also preferred to heat the sample (the outer metal mass and the inner graphite mass) directly by passing an electric current through the outer metal mass in the HP/HT process during which the polycrystalline compact is formed.

9 Claims, 2 Drawing Figures

METHOD OF MAKING DIAMOND COMPACTS FOR ROCK DRILLING

DESCRIPTION

Technical Field

This invention pertains to polycrystalline diamond compacts made by high pressure-high temperature (HP/HT) processes and to their use in rotary drill bits.

BACKGROUND

A compact is polycrystalline mass of abrasive particles (e.g., diamond and cubic boron nitride) bonded together to form an integral, tough, coherent, high-strength mass. Representative U.S. Pat. Nos. on the subject of diamond compacts are: 3,136,615 (boron carbide bonding medium); 3,141,746; 3,239,321 (graphite-free diamond compact); 3,744,982 (boron alloyed diamond compact process): 3,816,085; and 3,913,280. A composite compact is a compact bonded to substrate material, such as cemented tungsten carbide (see U.S. Pat. No. 3,745,623) which is hereby incorporated by reference.

Compact cutting tools made from polycrystalline diamond which has been grown from graphite are disclosed in U.S. Pat. No. 3,850,053. Diamond compacts made from diamond mixed with graphite are disclosed in U.S. Pat. No. 3,850,591, and the growth of diamond on a seed crystal is found in U.S. Pat. No. 3,297,407. U.S. Pat. No. 4,164,527 teaches making a superhard article from a briquette made of diamond and a hard alloy matrix encased in an external envelope having a higher contraction coefficient than the briquette.

U.S. Pat. Nos. 3,831,428; (which is hereby incorporated by reference) 4,129,052; and 4,144,739 disclose wire drawing dies made from diamond. A diamond wire die compact in general comprises an inner mass which is predominantly polycrystalline diamond and an outer annular ring of metal bonded carbide bonded to and surrounding the inner mass of symetrical support thereof. The metal bonded carbide mass is selected from the group consisting of tungsten carbide, titanium carbide tantalum carbide and mixtures thereof with metal bonding material therein being present in a quantity of from about 6-25 weight percent and selected from the group consisting of cobalt, nickel, iron and mixtures thereof.

Drill bits utilizing compact cutter elements are disclosed in the following U.S. Pat. Nos. 3,407,445; 3,938,599; 4,006,788; 4,073,354; 4,098,362 (crown made of metal powder and braze alloy); 4,109,737 (compact cutters with tapered pins fitted into recesses); and 4,156,329 (furnace brazing).

The following U.S. patent applications are related to the same subject: Ser. No. 888,259; filed Mar. 20, 1978; and now allowed (sintered metal body with cutters at positive rake angle); Ser. No. 899,767; filed Apr. 24, 1978 and Ser. No. 947,865; filed Oct. 2, 1978 (V-shaped cutter for drag bits); and application Ser. No. 95,902 by Philippe Douglas St. Pierre filed Nov. 19, 1979 and assigned to the same assignee.

Most prior art attempts to use diamond compacts in drill bit applications utilize compacts in the form of right circular cylinders with a thin layer of polycrystalline daimond bonded to a cemented carbide substrate. The cutting element is formed by attaching the compact to the drill bit by brazing or soldering the carbide substrate to a cemented carbide pin which is inserted into sockets in the drill crown. The diamond layer is generally oriented in a radial sense to the center of rotation of the drill bit and penetrates the rock essentially as a cutting tool, with rake angles essentially zero to about five degrees negative. In the design, the cutting elements protrude from the drill bit body, and thereby provide aggressive cutting action. The stresses on each cutting element are severe, and failures occur by gross chipping or cracking of the compact. The failure problem is essentially due to lack of support for the polycrystalline diamond layer which has a shear or tensile strength of only about 100 Kg/mm$^2$.

DISCLOSURE OF INVENTION

A method is provided for making composite diamond compacts similar to the wire drawing die compacts and which may be used as cutting elements in drill bits. The support provided by the surrounding metal would help to prevent the failures prevalent with the thin layer type cutting elements described in the background section.

This invention represents an improvement over the known methods, represented by a combination of U.S. Pat. Nos. 3,831,428 and 3,850,053, which comprises the steps of:

A. Positioning in an enclosure a sample comprising a formed hollow mass of metal containing diamond forming catalyst and a mass of non-diamond carbon within the formed metal mass and in contact therewith;

B. Subjecting the sample to pressure-temperature conditions within the diamond stable region and above the catalyst melting point;

C. Reducing the temperature and pressure of the sample; and

D. Recovering the resulting composite diamond compact;

wherein the improvement comprises disposing diamond seed crystals at the interface between the outer mass of metal and the inner mass of non-diamond carbon in Step A.

The composite diamond compact thus formed would be grown directly from graphite or a mixture of graphite and diamond in the central portion of a hollow cylinder of cemented carbide or steel wherein the hollow cylinder provides the catalyst to convert the graphite to diamond. A hollow cylindrical metal body as described is filled directly with the graphite rod and the diamond seed crystals.

The outer metal mass is made of a material selected from the group consisting of: a metal bonded carbide selected from the group consisting of tungsten carbide, titanium carbide and tantalum carbide bonded with a material selected from cobalt, nickel and iron; a cermet of nickel-bonded chromium carbide; an alloy steel containing chromium, nickel and cobalt; a nickel based alloy; a cobalt based alloy; and an alloy steel containing at least ten weight percent of the carbide forming elements selected from chromium, titanium, zirconium, vanadium, tungsten and silicon. The alloy steels containing chromium, nickel and cobalt are exemplified by the INCONEL (Trademark of International Nickel Company) series. The nickel or cobalt based alloys are exemplified by the RENE (Trademark of Allvac Metals Company; Monroe, North Carolina) alloys. The alloy steels containing carbide forming elements are exemplified by the A, D, H, T and M series of tool steels.

The hole in the outer metal mass may be blind or straight through, but a blind hole is preferred.

Pressures in the range of 55-80 Kbar are preferred, combined with temperatures of 1300°-1800° C.

The placing of diamond crystals on the interface between the metallic cylinder and the graphite enhances nucleation and growth. The use of diamond as a nucleating agent insures rapid growth of a fine grained, high diamond content compact.

BEST MODE FOR CARRYING OUT THE INVENTION

Figure 1:
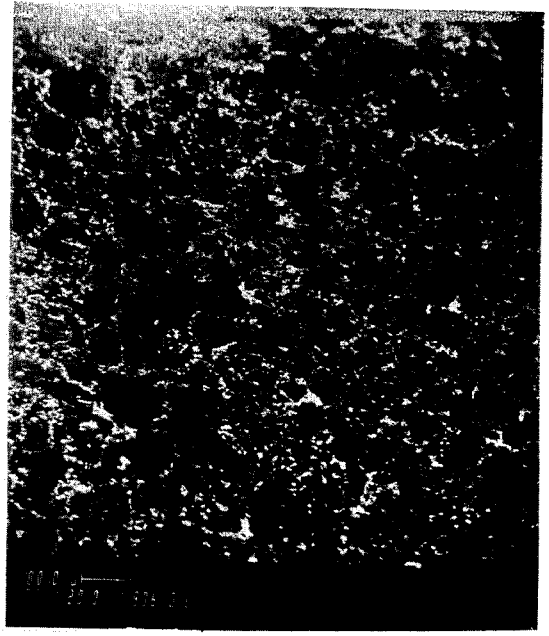
FIG. 1 is a photomicrograph (magnified about 82 X) of the polycrystalline diamond portion of a composite compact made according to U.S. Pat. No. 3,831,428.

Preferably the inner mass of non-diamond carbon is a right circular cylinder of graphite. The preferred materials for the hollow metal cylinder are cermets and metal alloys having coefficients of thermal expansion slightly higher than diamond, so that the diamond composite is placed in radial compression when the composite is cooled from the high temperature used in the formation.

Other desirable and preferred properties of the metal cylinder would be high compressive strengths (e.g., 400,000-800,000 psi or $2.8-5.5 \times 10^6$ K Pascals, kPa) to provide maximum support to the diamond. A high modulus elasticity (E) is also preferred to allow for elastic deformation without developing tensile strains in the high modulas polycrystalline diamond core. Materials satisfying both of these criteria are steel and steel alloys ($E = 30 \times 10^6$ psi, $2.1 \times 10^8$ kPa), cemented carbides ($E = 70-95 \times 10^6$ psi, $4.8-6.6 \times 10^8$ kPa), and tungsten and molybdenum ($E = 53$ and $42 \times 10^6$ psi, respectively, 3.7 and $2.9 \times 10^8$ kPa).

A particularly important consideration for chosing the composition of the metal cylinder is that it should have relatively high abrasion resistance after HP/HT processing. This would be best served if the metal has a stable carbide content of at least 10% by weight. This is to insure that free carbon (graphite) does not precipitate in the metal after quenching from the liquid phase at HP/HT and weaken the structure. Cermets like cobalt cemented tungsten carbide and nickel bonded chromium carbide are examples of good materials and alloy steels containing more than about 10% of the carbide forming elements Cr, Ti, Zr, V, Mo, W and Si would also be preferred.

One preferred form of a HP/HT appartus in which the compacts of this invention may be prepared is the subject of U.S. Pat. No. 2,941,248 (incorporated herein by reference) which is called a belt apparatus. It includes a pair of opposed cemented tungsten carbide punches and an intermediate belt or die member of the same material. The die member includes an aperture in which there is positioned a reaction vessel shaped to contain a reaction zone assembly. Between each punch and the die there is a gasket assembly comprising a pair of thermally insulating and electrically nonconducting pyrophyllite members and an intermediate metallic gasket.

The reaction vessel, in one preferred form, includes a hollow cylinder. The cylinder may be made of an inert material, such as salt, talc or lava, which (1) is not substantially converted during HP/HT operation to a stronger, stiffer state (as by phase transformation and/or compaction) and (2) is substantially free of volume discontinuities occurring under the application of high temperatures and pressures. Materials meeting the criteria set forth in U.S. Pat. No. 3,030,662 (Col. 1,1.59-Col. 2,1.2, incorporated by reference) are useful for preparing the cylinder.

Positioned concentrically within and adjacent to the cylinder may be a graphite electrical resistance heater tube. Within the graphite heater tube, there is concentrically positioned a cylindrical inert liner. The ends of the liner are fitted with inert plugs disposed at the top and the bottom.

The graphite heater tube is electrically isolated from the sample, and this is termed indirect heating. A directly heated reaction cell is preferable for the HP/HT processing to provide a radial temperature gradient. In direct heating, the electrical heating current passes directly through the sample, and the sample resistance itself provides the heat generation. For direct heating, electrical conductivity is needed. So, for making the thin layer type compacts, no direct heating is possible, since the diamond layer is initially not electrically conducting. This of course is not true with cup-shaped or annular metal mass. Direct heating facilities diamond growth without over heating the metal cylinder.

Electrically conductive metal end discs utilized at each end of the cylinder to provide electrical connection to the graphite heater tube or the outer metal mass. Adjacent to each disc is an end cap assembly each of which comprises a pyrophyllite plug or disc surrounded by an electrically conducting ring.

Operational techniques for simultaneously applying both high pressure and high temperatures in this type of apparatus are well known to those skilled in the super-pressure art. The reaction zone assembly (or cell) fits within the space defined by the liner and the plugs. The reaction zone assembly consists of a cylindrical sleeve of shield metal selected from the group consisting of zirconium, titanium, tantalum, tungsten, and molybdenum. Within the shield metal sleeve is a subassembly confined within a shield metal disc and a shield metal cup.

Disposed within the cavity defined by the shield metal disc and cup is an annulus (or cup) made of cold pressed sinterable carbide powder (mixture of carbide powder and appropriate metal bonding medium therefor). If desired, the annulus may be made of presintered metal bonded carbide or fully sintered metal bonded carbide. Within the annulus or cup is disposed a mass of non-diamond carbon (e.g., graphite). A catalyst which converts non-diamond carbon to diamond must be present in contact with the graphite. This is accomplished by using a carbide cementing metal in the annulus which is also a catalyst for the formation of diamond (e.g., cobalt, nickel or iron). For more details, see U.S. Pat. No. 3,850,053 (which is incorporated by reference).

Seed diamond crystals may be adhered to the graphite by physically pressing the graphite to the seeds. A mono-layer of seed crystals on the surface is preferred, with seed crystal spacing of two crystals diameters or less.

The balance of the volume in the reaction zone assembly may be taken up with a disc made of the same material as the cylinder (e.g., pyrophyllite) and discs made of hexagonal boron nitride to minimize the entry of undesirable substances into the subassembly defined by the shield metal disc and cup.

The conditions for the HP/HT process are:

Typical seed diamond particles in the range of 0.1 to 500 microns largest dimension. One to 50 microns is optimum to enhance closely spaced nucleation sites and the growth of a high diamond density compact. If the seeds are too coarse, close nucleation is not achieved; if too fine, they dissolve.

Pressure temperature conditions within the diamond stable region and above the catalyst melting point, typically at pressures of 60 to 80 Kbar and temperatures of 1300°-1500° C. These pressure temperature conditions are well within the diamond stable region.

A reaction time of three to 15 minutes.

The diamond stable region is the range of pressure temperature conditions under which diamond is thermodynamically stable. On a pressure-temperature phase diagram, it is generally the high pressure side, above the equilibrium line between diamond and graphite. Pressure and temperature conditions are selected to be displaced from the equilibrium line so as to assure rapid growth of the diamond compact. These conditions differ from those used to sinter diamond in the prior art, since in the process of sintering diamond, the position within the diamond stable region is not critical.

The reaction zone assembly is loaded into the reaction vessel which is placed in the HP/HT belt apparatus. First, the pressure and then the temperature are increased and held at the desired conditions for sufficient time for sintering to occur. The sample is then allowed to cool under pressure for a short period of time, and finally the pressure is decreased to atmospheric pressure, and the compact is recovered.

The resulting composite diamond compact may be recovered by various methods. The shield metal sleeve can be mechanically removed. Any adhering shield metal may be dissolved in acid (e.g., a mixture of hydrofluoric and nitric acids) with care to avoid dissolving the metal body. Alternatively, any adhering metal from the shield metal cup or disc may be ground or lapped off or removed with a fine jet of abrasive grit.

Polycrystalline diamond has been directly grown from the catalyst metal in cobalt cemented tungsten carbide compositions having a cobalt content of 6-35% by weight when in contact with graphite. It has also been grown starting with nickel chromium alloys and nickel cemented chromium carbide alloys containing 5-30% chromium by weight.

EXAMPLE

Figure 2:
FIG. 2 is a photomicrograph (magnified about 82 X) showing the polycrystalline diamond portion of a composite compact made by the improved method of this invention, and showing the finer grain which results.

A cylindrical body of cobalt cemented tungsten carbide with approximate dimensions: internal diameter 2.5 mm, outside diameter 8 mm, Length 4 mm, was closed at one end with a cemented carbide plug to form a closed end cylinder. A rod of graphite, machined to fit closely inside the carbide cylinder was impregnated on the surfaces which contacted the carbide with a small amount of about 50 micron sized diamond powder sufficient to form a partial monolayer of diamond on this interface. This was easily accomplished by rolling or pushing the graphite against a flat surface which had diamond powder distributed on it. The sample was exposed to pressures of about 65 Kb at temperatures of about 1500°-1600° C. for 10 minutes. Very rapid growth of diamond occurred to essentially completely fill the cavity with a polycrystalline mass of diamond in a conventional HP/HT apparatus. The diamond content was estimated to be in excess of 90% of the volume. Microstructural examination, as shown by FIGS. 1 and 2, illustrates the high diamond content and relatively uniform structure. In grinding and lapping the sample for analyzing structure, it was found to be exceedingly resistant to abrasion by the diamond abrasives used.

Other embodiments of this invention will be apparent to those skilled in the art from a consideration of this specification or practice of the invention disclosed herein. It is not intended that the invention be limited to the disclosed emobidiments or to the details thereof, and departures may be made therefrom within the spirit and scope of the invention as defined in the following claims.

I claim:

1. An improved method for making a composite diamond compact having an inner polycrystalline diamond mass surrounded by and bonded to an outer mass of a material selected from metals, metal alloys and cermets, which method comprises:
   A. Positioning in an enclosure a sample comprising a formed hollow mass of a material selected from metals, metal alloys and cermets, which contains a diamond forming catalyst and a mass of non-diamond carbon within the formed hollow mass and in contact therewith;
   B. Subjecting the sample to pressure-temperature conditions within the diamond stable region and above the catalyst melting point;
   C. Reducing the temperature and pressure of the sample; and
   D. Recovering the resulting composite diamond compact; wherein the improvement comprises disposing a mono-layer of diamond seed crystals having a largest dimension of from 0.1 to 500 microns at the interface between the hollow outer mass and the inner mass of non-diamond carbon in Step A.

2. The improved process as recited in claim 1 wherein the inner mass is in the form of a right circular cylinder and the hollow outer mass is cup-shaped.

3. The improved process as recited in claim 2 wherein the non-diamond carbon is graphite.

4. The improved method as recited in claim 3 wherein the hollow outer mass is made of material selected from the group consisting of: a metal bonded carbide selected from the group consisting of tungsten carbide, titanium carbide and tantalum carbide bonded with a material selected from cobalt, nickel and iron; a cermet of nickel-bonded chromium carbide; an alloy steel containing chromium, nickel and cobalt; a nickel based alloy; a cobalt based alloy; and an alloy steel containing at least ten weight percent of the carbide forming elements selected from chromium, titanium, zirconium, vanadium, tungsten and silicon.

5. The improved method as recited in claim 4 wherein the pressure in Step B ranges from about 55 to 80 Kbar and the temperature ranges from about 1300° to 1800° C., and wherein the diamond seed crystals have a largest dimension of from 1 to 50 microns and have a spacing of two crystal diameters or less.

6. The improved method as recited in claim 5 wherein the conditions of Step B are achieved by direct heating of the sample.

7. The improved method as recited in claim 5 wherein the cup-shaped outer mass has a coefficient of thermal expansion slightly higher than diamond, in order to place the inner mass in radial compression.

8. The improved method as recited in claim 7 wherein the cup-shaped outer mass is made of a material having a compressive strength of $2.8-5.5 \times 10^6$ K Pascals and a modulus of elasticity of from $2.1$ to $6.6 \times 10^6$ K Pascals selected from the group consisting of steel, steel alloys and cemented carbides.

9. The improved method as recited in claim 7 wherein the cup-shaped outer mass has a stable carbide content of at least 10% by weight.

* * * * *